Jan. 15, 1952     F. I. STEELE     2,582,609
MEANS FOR FUELING AIRCRAFT IN FLIGHT
Filed March 30, 1949                            2 SHEETS—SHEET 1
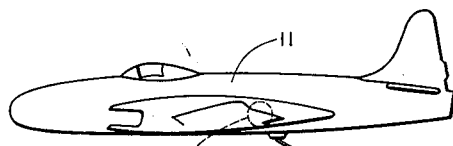
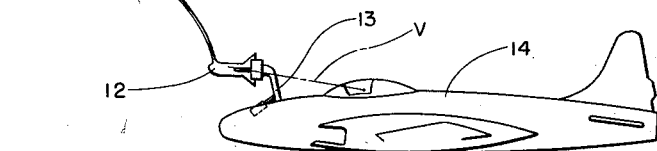
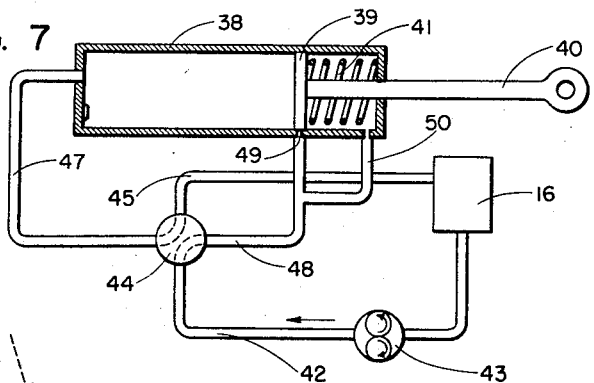
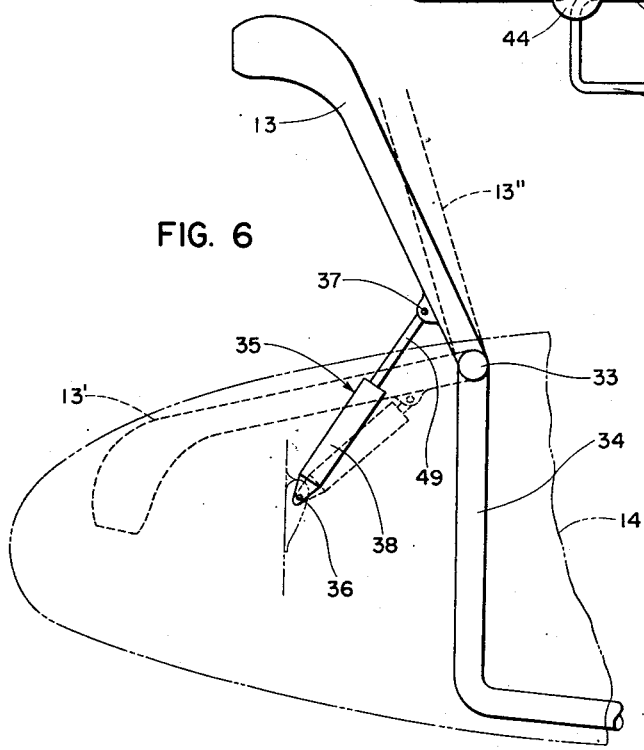
INVENTOR.
FREDERICK I. STEELE
BY
Richard W. Treverton
ATTORNEY.

Jan. 15, 1952  F. I. STEELE  2,582,609
MEANS FOR FUELING AIRCRAFT IN FLIGHT
Filed March 30, 1949  2 SHEETS—SHEET 2
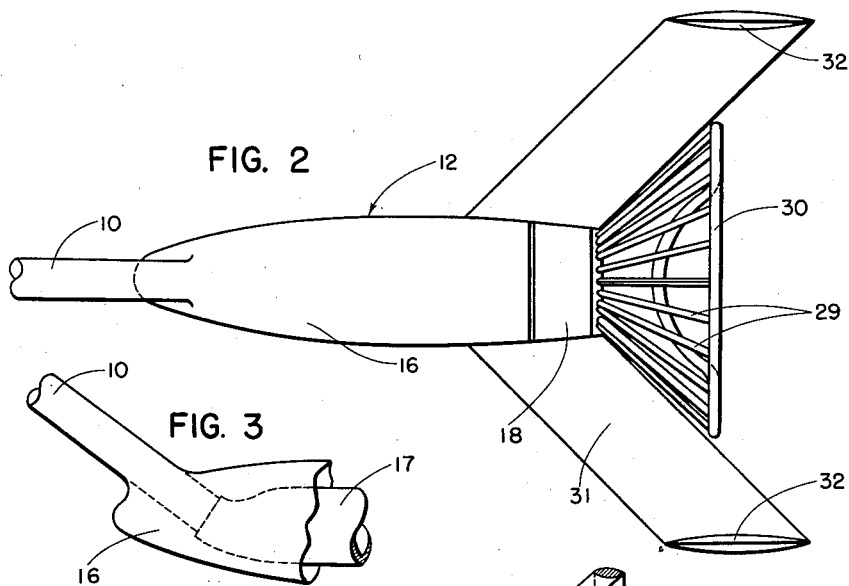
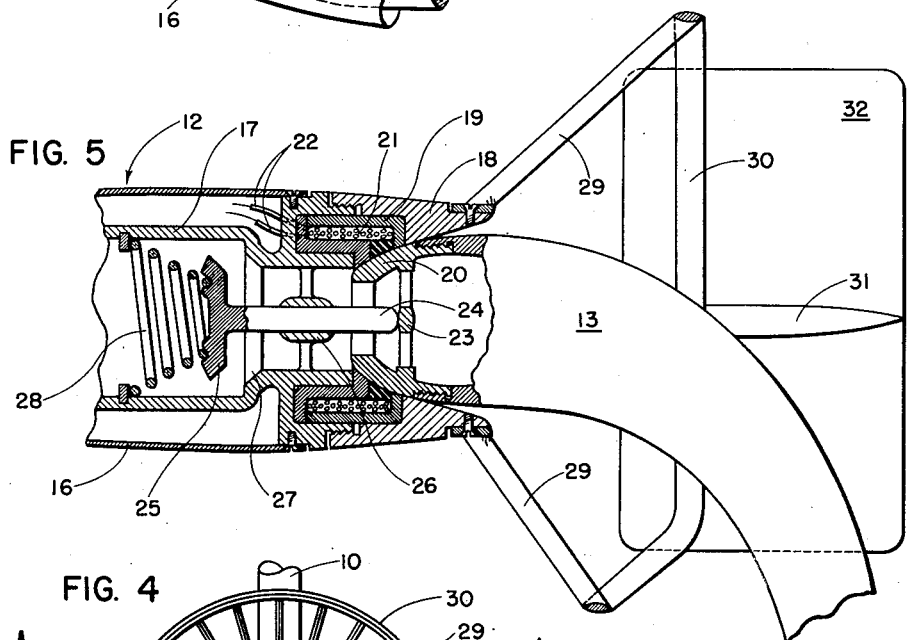
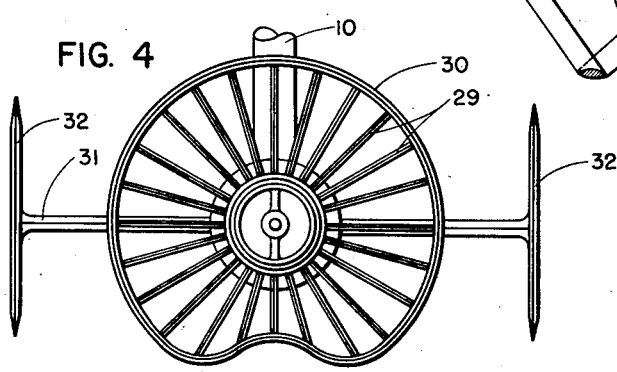
INVENTOR.
FREDERICK I. STEELE
BY
Richard W. Treverton
ATTORNEY.

Patented Jan. 15, 1952

2,582,609

UNITED STATES PATENT OFFICE 2,582,609

MEANS FOR FUELING AIRCRAFT IN FLIGHT

Frederick I. Steele, Columbus, Ohio, assignor to Curtiss-Wright Corporation, a corporation of Delaware Application March 30, 1949, Serial No. 84,330

12 Claims. (Cl. 244—135)

The present invention relates to fueling aircraft in flight and provides an improved means for quickly connecting two airplanes for the transfer of fuel from one to the other.

According to the invention one airplane is provided with a flexible hose which may be caused to trail into proximity with the other airplane which is flying at a different level. Carried by the trailing end of the hose is a body, hereinafter called a "bird," adapted to be automatically coupled upon contact to the end of a tubular boom extended from the other airplane. The bird is provided with airfoil means for stabilizing it both longitudinally and directionally, making it a relatively stationary target for the boom when the two airplanes are flying at substantially the same speed and in the same direction; and the end of the boom is preferably arranged directly in the field of forward vision of the pilot of the boom carrying airplane so that he may "fly" it into engagement with the bird in much the same manner as he would maneuver the airplane to bring a fixed gunsight to bear upon a target.

A further objective of the invention resides in the provision of means to further facilitate final coupling engagement of the boom with the bird. To this end a funnel-like foil is formed on the bird to receive and guide the nose of the boom into engagement with the coupling means. A still further objective is the provision of electromagnetic means, part of which is on the bird and part on the boom, for automatically coupling the boom to the bird with a force strong enough to resist the loads tending to separate them in normal refueling operations, but frangible enough to permit the airplanes to be flown apart in an emergency. The invention provides valve means which close automatically when the coupling is broken to prevent the loss of fuel and the danger of fire incident thereto.

The foregoing and other objects and advantages of the invention will appear from the following description of the form of the invention shown in the accompanying drawings, wherein:

Fig. 1 is a side elevational view showing the two airplanes entering into fueling engagement;

Figs. 2, 3 and 4 are respectively a plan, a fragmentary side elevation and a rear elevation of the bird;

Fig. 5 is a longitudinal sectional view, on a larger scale, showing the interengaging parts of the bird and the boom;

Fig. 6 is a side elevation of the boom and fluid operating means therefor mounted on one airplane; and, Fig. 7 is a diagrammatic illustration of the boom operating means and a fluid circuit therefor.

As shown in Fig. 1 a flexible hose 10 trailing from a supply airplane 11 has at its lower end a bird 12 adapted to be detachably coupled to the upper end of a tubular boom 13 extending from an airplane 14 that is to receive the fuel. Airplane 11 is provided with a reel 15 on which the hose 10 is wound when not in use, the bird 12 then being either retracted into the fuselage of airplane 11 or so close to the exterior of the fuselage as not to interfere with takeoff or landing. The end of the hose that remains secured to the reel is connected through suitable valve means (not shown) with one or more fuel tanks in airplane 11, so that after a coupling between the bird and the boom is effected fuel may be caused to flow, preferably under pressure so as to reduce the time of transfer, from the supply airplane into receiving airplane 14.

The bird 12 has an elongated slender body comprising an outer shell 16 and an inner tubular member 17 whose forward end is connected with the hose 10. Secured by a ring 18 to the opposite end of member 17 is an annular electromagnet 19 whose poles are shaped to receive nose section 20 of the boom 13, this section being of soft iron or other material suitable to form an armature for the magnet. The windings 21 of the magnet are connected by suitable leads 22 extended along hose 10 to a battery or other suitable source of electric energy (not shown) and switch means in airplane 11, whereby the magnet may be selectively energized or deenergized by personnel of that airplane. The electromagnet is of sufficient strength to hold the bird coupled with the boom against the resistance of loads tending to separate them and of the magnitude to be normally expected in the fueling operation. An annular gasket of rubbery material disposed between the poles of the electromagnet is arranged to be slightly compressed when the armature 20 is seated, so that a substantially liquid tight seal is provided between the bird and the boom.

Extending across the section 20 is a spider 23 engageable with the stem 24 of a valve 25. The stem is slidable in a guide 26 supported in a spider within tubular member 17, so that the valve may move to and from an annular valve seat 27. A spring 28 is arranged to hold the valve seated at all times except when the nose section 20 of the boom is engaged with the magnet, as shown in Fig. 5.

To facilitate engagement of the boom a conical guide is extended rearwardly from the ring 18. This guide comprises spaced radially and rearwardly extending bars 29 and a ring 30 connecting the bars at their outer ends. For stabilizing the bird sweptback airfoils 31 extend substantially horizontally from opposite sides of the ring 19, and substantially upright end plates 32, constituting vertical stabilizers, are provided at the tips of airfoils 31.

As indicated in Fig. 6 the boom 13 is pivoted at 33 to a fixed conduit 34 within the airplane 14 and communicating with the latter's fuel tanks (not shown). For operating the boom between its extended position shown in Figs. 1 and 5 and in full lines in Fig. 6, and its retracted position shown at 13' in dotted lines in Fig. 6, an extensible hydraulic strut 35 is pivoted at 36 to the airplane and at 37 to the boom. The strut comprises a cylinder 38, piston 39 and piston rod 40, and a compression spring 41 which acts to resiliently resist terminal movement of the piston in one direction, i. e. movement of the piston corresponding to motion of the boom 14 from the full line position toward the dotted line position indicated 13'' in Fig. 6.

The operating system for the hydraulic strut may comprise a pressure line 42 extended from a pump 43 to a reversing valve 44 and a return line 45 extended from the valve to a reservoir 46 that is in fluid communication with the pump inlet. Extending from the reversing valve to one end of the cylinder 38 is a line 47 while another line 48 extends from the valve to an intermediate part 49 in the cylinder, there being a branch line 50 from line 48 into the end of the cylinder adjacent spring 41. Port 49 is constricted to retard the flow of liquid through it for a function to be described hereinafter. The reversing valve is preferably located in a position that is easily accessible to the pilot or other personnel of the receiving airplane.

The boom is caused to be raised to working position by turning the reversing valve to connect pressure line 42 with line 47 and return line 45 with line 48. Fluid under pressure from the pump 43 then moves the piston to extend the strut. This action continues until the piston has moved to the right slightly beyond the position shown in Fig. 7 to at least partly uncover port 49 so that fluid may circulate through the cylinder, entering the latter through line 47 and exhausting through port 49 for return to the reservoir. In this condition the spring 41 is partially compressed, the spring force balancing the pressure on the piston resulting from the flow restriction at port 49.

When the boom contacts the bird, the hydraulic strut acts as a cushioning and shock-absorbing device; if the airplane 14 is traveling slightly faster than the bird at the moment of contact with the latter the impact is cushioned by rearward movement of the boom toward the position shown in dotted lines at 13'' in Fig. 6. This movement is resisted by the spring 41 and also by the resistance of fluid flow through passage 50 as fluid is displaced from the right end of the cylinder. Any tendency of the boom to rebound on striking the bird, say from the position shown in dotted lines at 13'' toward the position shown in full lines in Fig. 6, is damped by the resistance to fluid flow outwardly through port 49 and into the right end of the cylinder through branch passage 50.

To effect lowering of the boom into the retracted position within airplane 14 indicated at 13', the valve 44 is moved to the position shown in Fig. 7. Thereupon fluid from the pressure line 42 will enter the cylinder through branch passage 50, and fluid will return from the cylinder to the reservoir 16 via lines 47 and 45, with the result that the piston will be moved to the left, thereby contracting the strut.

With the boom in erected position and the electric circuit through windings 21 closed to energize the magnet, the airplane 14 approaching the bird 12 from the rear may be maneuvered to engage the nose section 20 of the boom with the electromagnet 19. In effecting this engagement the pilot of airplane 14 may sight the upper end of the boom, which is directly in his line of forward vision, on the ring 35 as a target; the line of sight being indicated at V in Fig. 1. The bars 29 provide a foil of relatively large area for initial contact by the boom, and upon such contact the airplane 14 may be moved vertically or laterally, or both, as may be necessary to center the boom nose 19 within the electromagnet. As soon as the armature is brought in close proximity with the magnet, the latter will seize it, effecting a firm coupling. Simultaneously with the coupling action the valve 24 is opened, so that upon operation of pump means and/or valve means in the supply airplane fuel may flow through the hose and boom into the tanks of airplane 14.

When the fueling operation has been completed the magnet is deenergized and the airplane 14 is allowed to drop back to effect complete separation of the boom from the bird. The boom may be retracted into airplane 14 and the hose 10 reeled into airplane 11. Should an emergency or accidental change of flight path or relative speed of the airplanes cause them to pull apart against the holding force of the electromagnet while fueling is in progress, the valve 24 is immediately closed by action of spring 28 so that no appreciable loss of fuel occurs.

It will be seen that in effect the bird and the annular armature or boom nose section 20 together constitute a detachable coupling device one section of which is carried by the trailing flexible tube or hose 10 and the other section of which is carried by the tubular boom 13. Certain reversals of the parts may be readily made if desired; for example the airplane 14 may be made the supply aircraft and airplane 11 the receiving aircraft. The magnet may be provided on the boom and the armature on the bird instead of the preferred arrangement illustrated. It will be understood further that the principles of my invention may also be applied in still other different physical forms and arrangements of the apparatus involved, and that the foregoing disclosure of the preferred embodiment of these principles has been made by way of illustration and example and not by way of limitation, there being no intention to limit scope of the invention except as may be specifically required by the appended claims.

I claim as my invention:

1. Means for transferring fluid from a supply aircraft to a receiving aircraft comprising: a first tubular member adapted to extend from one aircraft and a second tubular member on the other aircraft, a coupling device comprising a first section carried by said first member and a complementary section on said second member said coupling device being responsive to contact of said sections to secure them together, means mounting said second member for movement between a retracted position and an extended position wherein said complementary section is disposed substantially in the field of forward vision of a pilot of said other aircraft, and power operated means for effecting extension and retraction of said second member, said power operated means comprising an extensible hydraulic strut, and resilient means associated with said strut to absorb impact loads incident to engagement of said sections.

2. Means for transferring fluid from a supply aircraft to a receiving aircraft comprising: a first tubular member adapted to extend from one aircraft and a second tubular member on the other aircraft, a coupling device comprising a first section carried by said first member and a complementary section on said second member said coupling device being responsive to contact of said sections to secure them together, means mounting said second member for movement between a retracted position and an extended position wherein said complementary section is disposed substantially in the field of forward vision of a pilot of said other aircraft, and power operated means for effecting extension and retraction of second member, said power operated means comprising an extensible hydraulic strut, resilient means associated with said strut to absorb impact loads incident to engagement of said sections, and means to snub rebound action of said resilient means.

3. Means for transferring fluid from a supply aircraft to a receiving aircraft comprising: a first tubular member adapted to extend from one aircraft and a second tubular member on the other aircraft, a coupling device comprising one section on the extending end of said first member and a complementary section on said second member said coupling device being responsive to contact of said sections to secure them together, means mounting said second member for movement between a retracted position and a position wherein it projects from the other aircraft, an extensible hydraulic strut comprising a cylinder and piston for operating said second member between its retracted and projected positions, fluid bypass means at one end of the cylinder providing for movement of said second member from its normal extended position under impact loads imposed by engagement of said sections, spring means for resiliently resisting said movement, said bypass means being arranged to snub rebound action of said spring means by retarding the passage of fluid through said by-pass means.

4. Means for transferring fluid from a supply aircraft to a receiving aircraft comprising: a first tubular member extending from one aircraft and a flexible tubular member adapted to extend from the other aircraft, a coupling device having a fluid passage therethrough and comprising a section on the extending end of said first member and a complementary section on said flexible member, one section comprising an annular electromagnet having a flexible sealing ring disposed between the poles thereof, and the other section being an annular armature adapted to seat within said electromagnet and against said flexible sealing ring, said electromagnet when energized and brought into coupling relationship being adapted to seize and hold said armature, valve means in said fluid passage of the coupling device arranged for opening movement by and upon entry of said sections into coupled relationship, spring means for urging closing of the valve means when said sections are uncoupled, a plurality of bars radiating from said one of said sections to provide a funnel shaped foil for guiding said sections into coupling relationship, a ring encircling and joined to the ends of said bars for defining a circular target for the other of said sections, and airfoil means extending from the section on said flexible member for stabilizing it to facilitate entering said sections into such coupling relationship.

5. Means for transferring fluid from a supply aircraft to a receiving aircraft comprising: a first tubular member extending from one aircraft and a flexible tubular member adapted to extend from the other aircraft, a coupling device comprising a section on the extending end of said first member and a complementary section on said flexible member, one section being an annular electromagnet having a flexible sealing ring disposed between the poles thereof, and the other section being an annular armature adapted to seat within said electromagnet and against said sealing ring, said electromagnet when energized being adapted to seize and hold said armature when said sections are brought into coupling relationship for providing a fluid passage, connecting said tubular members and extending through the coupling device, valve means in said fluid passage arranged for opening movement by and upon entry of said sections into coupled relationship, and spring means for urging closing action of the valve means when said sections are uncoupled.

6. Means for transferring fluid from a supply aircraft to a receiving aircraft comprising: a first tubular member extending from one aircraft and a flexible tubular member adapted to extend from the other aircraft, a coupling device comprising a section on the extending end of said first member and a complementary section on said flexible member, one section being an annular electromagnet and the other section being an annular armature adapted to seat within said electromagnet, said electromagnet when energized being adapted to seize and hold said armature when said sections are brought into coupling relationship for providing a fluid passage, connecting said tubular members and extending through the coupling device, and valve means in said fluid passage arranged for opening and closing movement by and upon coupling and uncoupling, respectively, of said sections.

7. Means for transferring fluid from a supply aircraft to a receiving aircraft comprising: a first tubular member extending from one aircraft and a flexible tubular member adapted to extend from the other aircraft, a coupling device comprising a section on the extending end of said first member and a complementary section on said flexible member, one section being an annular electromagnet with inwardly facing poles and the other section being an annular armature adapted to seat within said electromagnet in bridging relation to said poles, said electromagnet when energized being adapted to seize and hold said armature when said sections are brought into coupling relationship for providing a fluid passage connecting said tubular members and extending through the coupling device.

8. Means for transferring fluid from a supply aircraft to a receiving aircraft comprising: a first tubular member extending from one aircraft and a flexible tubular member adapted to extend from the other aircraft, a coupling device having a fluid passage therethrough and comprising a section on the extending end of said first member and a complementary section on said flexible member; means responsive to coupling contact of said members for causing said members to couple securely upon engagement, valve means in the fluid passage of the coupling device arranged for opening movement by and upon entry of said sections into coupled relationship, and spring means for urging closing action of the valve means when said sections are uncoupled.

9. Means for transferring fluid from a supply aircraft to a receiving aircraft comprising: a first tubular member extending from one aircraft and a flexible tubular member adapted to extend from the other aircraft, a coupling device having a fluid passage therethrough and comprising a section on the extending end of said first member and a complementary section on said flexible member; means responsive to coupling contact of said members for causing said members to couple securely upon engagement; and valve means in the fluid passage of the coupling device arranged for opening and closing movement by and upon coupling and uncoupling, respectively, of said sections.

10. Means for transferring fluid from a supply aircraft to a receiving aircraft comprising: a first tubular member extending from one aircraft and a flexible tubular member adapted to extend from the other aircraft, a coupling device having a fluid passage therethrough and comprising a section on the extending end of said first member and a complementary section on said flexible member, valve means in said fluid passage arranged for opening movement by and upon entry of said sections into coupled relationship, a plurality of bars radiating from one of said sections to provide a funnel shaped foil for guiding said sections into coupling relationship, a ring encircling and joined to the ends of said bars for defining a circular target for the other of said sections, and airfoil means extending from the section on said flexible member for stabilizing it to facilitate entering said sections into such coupling relationship.

11. Means for transferring fluid from a supply aircraft to a receiving aircraft comprising: a first tubular member extending from one aircraft and a flexible tubular member adapted to extend from the other aircraft, a coupling device comprising a section on the extending end of said first member and a complementary section on said flexible member, a plurality of bars radiating from one of said sections to provide a funnel shaped foil for guiding said sections into coupling relationship, and a ring encircling and joined to the ends of said bars.

12. Means for transferring fluid from one aircraft to a second aircraft comprising a tubular member trailing from the first aircraft having, adjacent its trailing end, a skeletonized funnel-like frame extending rearwardly therefrom, said frame at its smaller forward end having a coupling member, a second tubular member on the second aircraft movable from a retracted position wholly within the aircraft to an extended position, said second tubular member including means for its resilient support in its aircraft and including a forwardly facing coupling member adapted for entry into said funnel-like frame and for engagement with said first coupling member, said coupling members including leak-minimizing elements coactable with one another when the members are coupled, one member including a preselectively energizable element operable to secure said members together automatically upon engagement of the members with one another, said element being de-energizable selectively to release said members and being separable in response to separation of said aircraft while energized, and valve means normally closing the first coupling member, openable in response to coupling of the two members to admit of fluid passage through said tubular members from the first aircraft to the second aircraft.

FREDERICK I. STEELE.

REFERENCES CITED

The following references are of record in the file of this patent:

UNITED STATES PATENTS

| Number | Name | Date |
| --- | --- | --- |
| 541,908 | Weaver | July 2, 1895 |
| 807,517 | Vance | Dec. 19, 1905 |
| 1,728,449 | Procofieff | Sept. 17, 1929 |
| 1,848,372 | Moran | Mar. 8, 1932 |
| 1,935,672 | Settle | Nov. 21, 1933 |
| 2,199,588 | Cobham | May 7, 1940 |
| 2,388,013 | Rasor | Oct. 30, 1945 |
| 2,419,438 | Clark | Apr. 22, 1947 |
| 2,434,464 | Lemonier | Jan. 13, 1948 |

FOREIGN PATENTS

| Number | Country | Date |
| --- | --- | --- |
| 369,228 | Great Britain | Mar. 16, 1932 |